US006889264B2

(12) United States Patent
Clough et al.

(10) Patent No.: US 6,889,264 B2
(45) Date of Patent: May 3, 2005

(54) IMPOSING A DELAY FOR INDICATION OF A STATUS BOARD TO PROVIDE A TIME FOR SELF-RECTIFICATION OF A SERVICE EVENT DETECTED FROM PERIPHERAL STATUS INFORMATION

(75) Inventors: James Clough, Boise, ID (US); Darrel Cherry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 94 days.

(21) Appl. No.: 10/267,897

(22) Filed: Oct. 9, 2002

(65) Prior Publication Data

US 2004/0073720 A1 Apr. 15, 2004

(51) Int. Cl.[7] .......................... G06F 11/30; G06F 11/32
(52) U.S. Cl. .............................. 710/15; 710/19; 714/47
(58) Field of Search ..................... 710/15, 19; 709/223, 709/224; 700/17, 19–21; 714/25, 47, 48; 358/1.15; 399/8; 340/825.36

(56) References Cited

U.S. PATENT DOCUMENTS

| 4,361,832 A | | 11/1982 | Cole |
| 4,740,787 A | | 4/1988 | Kimura |
| 5,084,875 A | | 1/1992 | Weinberger et al. |
| 5,214,772 A | | 5/1993 | Weinberger et al. |
| 5,220,674 A | | 6/1993 | Morgan et al. |
| 5,282,127 A | * | 1/1994 | Mii ............................... 700/1 |
| 5,323,393 A | | 6/1994 | Barrett et al. |
| 5,491,473 A | * | 2/1996 | Gilbert .................. 340/870.01 |
| 5,504,863 A | | 4/1996 | Yoshida |
| 5,699,493 A | | 12/1997 | Davidson, Jr. et al. |
| 5,720,015 A | | 2/1998 | Martin et al. |
| 5,727,135 A | | 3/1998 | Webb et al. |
| 5,923,834 A | * | 7/1999 | Thieret et al. ................. 714/25 |
| 6,055,063 A | | 4/2000 | Yang et al. |
| 6,108,492 A | * | 8/2000 | Miyachi ..................... 358/1.15 |
| 6,141,507 A | * | 10/2000 | Sawada ......................... 399/8 |
| 6,310,692 B1 | | 10/2001 | Fan et al. |
| 6,400,462 B1 | | 6/2002 | Hille |

FOREIGN PATENT DOCUMENTS

| EP | 0843229 | 7/1998 |
| EP | 1227618 | 7/2002 |
| EP | 1041768 | 1/2003 |
| EP | 1187396 | 1/2004 |
| GB | 2357351 | 6/2001 |

* cited by examiner

Primary Examiner—Ilwoo Park (57) ABSTRACT

Various systems and methods are provided for monitoring and supporting a number of peripheral devices. In one embodiment, a network is provided that comprises a local agent in a local server that is in data communication with the number of peripheral devices. An amount of status information is obtained from the peripheral devices and stored in the local server. The network also includes a central monitoring system in a central monitoring server that is in data communication with the local agent. A copy of the status information is transmitted from the local agent to the central monitoring system and stored in the central monitoring server. Also, a status board is maintained by the central monitoring system, the status board indicating at least one service event associated with an operation of at least one of the peripheral devices.

7 Claims, 6 Drawing Sheets

IMPOSING A DELAY FOR INDICATION OF A STATUS BOARD TO PROVIDE A TIME FOR SELF-RECTIFICATION OF A SERVICE EVENT DETECTED FROM PERIPHERAL STATUS INFORMATION

TECHNICAL FIELD

The present invention is generally related to the field of systems monitoring and, more particularly, is related to the central monitoring of peripheral devices.

BACKGROUND

As the components employed in computer systems such as microprocessors, hard drives, compact disk drives, floppy drives, and other devices have become smaller and smaller, the manufacture and use of portable computer systems such as laptop computers has become widespread. The fact that laptop computers are now in widespread use has had significant repercussions on society. For example, people can now take their work with them in their laptop computer and perform their work function in any location. To provide a specific example, business travelers can now continue to work on documents, plans, or other projects on computers while flying from one destination to another. It goes without saying that such portability has resulted in increased productivity as previously unproductive time can be employed to get work done.

Unfortunately, printing capability has not become portable in the same manner. The nature of printing hardware has prevented the creation of effective portable printing. As a consequence, the user of portable computer systems such as a laptop may often find themselves in a location in which they need to print a document from a laptop computer, but there is no printer available. For example, a business traveler may find himself in a hotel, airport, or other location in which they need to print a document. The proprietors of hotels and other such venues may wish to provide printers for such travelers in hotel rooms, specified locations in airports, or other locations that are coupled to local networks within such facilities. Ideally, the business travelers could link up to the local network to be able to print documents on such printers. However, including printers within each of the hotel rooms or other locations can impose a significant maintenance burden upon the managers of a hotel or other site. Specifically, in order to properly provide printing services, managers will inevitably have to implement maintenance and monitoring procedures to ensure reliable operation of such printing services. To do so, technically competent support personnel will have to be employed, thereby resulting in a significant cost burden that may make providing such printing services unfeasible.

SUMMARY

In view of the foregoing, the present invention provides for various systems and methods for monitoring and supporting the operation of a number of peripheral devices. In one embodiment, a method is provided that comprises storing the amount of status information obtained from the peripheral devices in a local server, transmitting the amount of status information associated with each of the peripheral devices from the local server to a central monitoring server, storing the amount of status information in the central monitoring server, analyzing the status information in the central monitoring server to detect the existence of at least one service event associated with an operation of at least one of the peripheral devices, and, maintaining a status board that indicates the at least one service event.

In another embodiment, the present invention provides for a network for monitoring and supporting a number of peripheral devices. In this respect the system comprises a local agent in a local server that is in data communication with the number of peripheral devices. An amount of status information is obtained from the peripheral devices and stored in the local server. The network also includes a central monitoring system in a central monitoring server that is in data communication with the local agent. A copy of the status information is transmitted from the local agent to the central monitoring system and stored in the central monitoring server. Also, a status board is maintained by the central monitoring system, the status board indicating at least one service event associated with an operation of at least one of the peripheral devices.

In still another embodiment, a system is provided for monitoring and supporting a number of peripheral devices. In this respect, the system comprises first means for obtaining and storing an amount of status information from the peripheral devices at a local site and second means for obtaining and storing a copy of the amount of status information from the first means, the second means being located at a central site. The system further comprises status means for indicating at least one service event associated with an operation of at least one of the peripheral devices, the status means being located at the central site.

Other features and advantages of the present invention will become apparent to a person with ordinary skill in the art in view of the following drawings and detailed description. It is intended that all such additional features and advantages be included herein within the scope of the present invention.

BRIEF DESCRIPTION OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
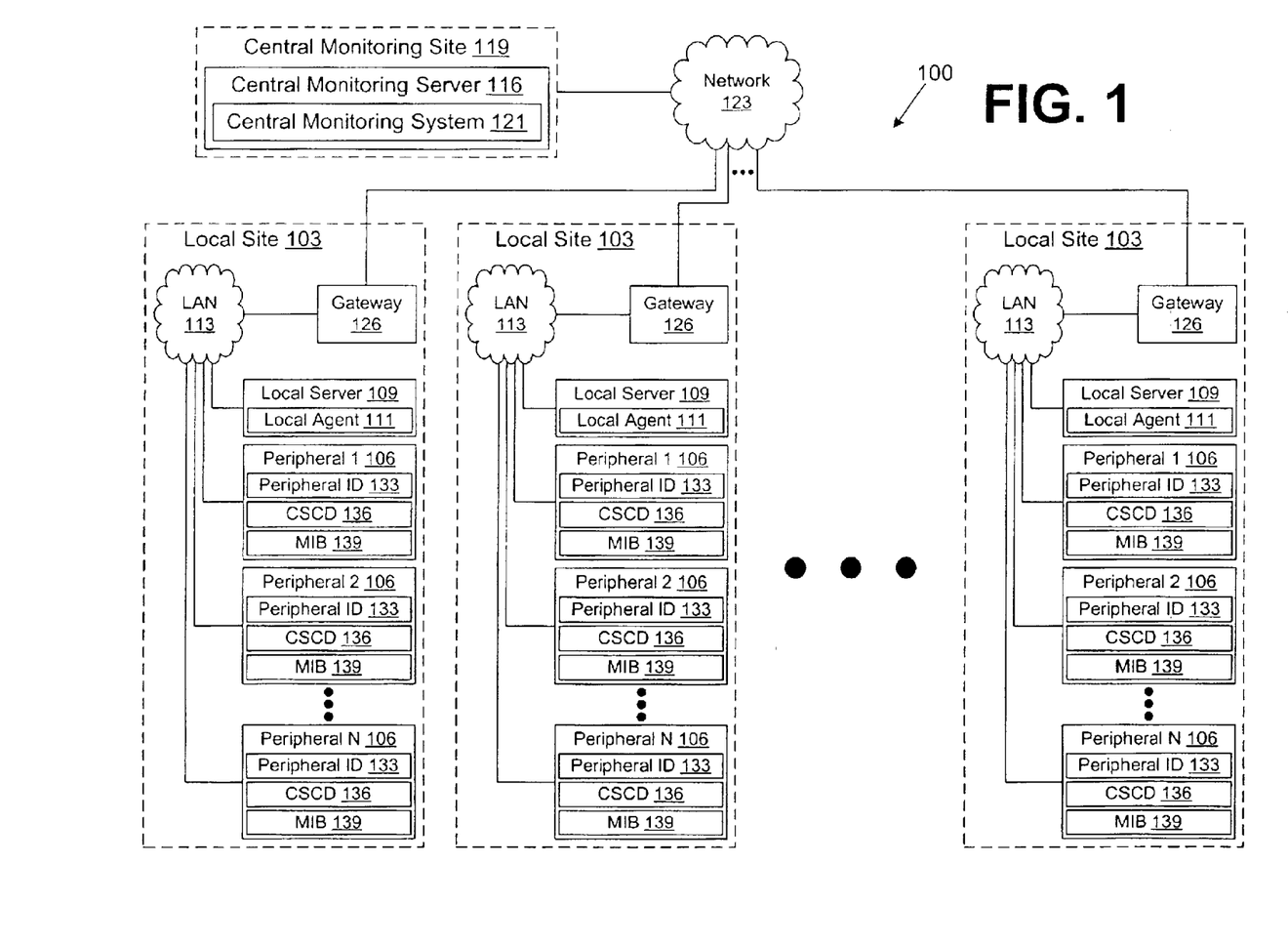
FIG. 1 is a block diagram of a peripheral monitoring network according to an embodiment of the present invention.

With reference to FIG. 1, shown is a central monitoring network 100 according to an embodiment of the present invention. The central monitoring network 100 provides for a monitoring of a number peripheral devices that are dispersed among a number of local sites, as will be described. In this respect, the central monitoring network 100 includes a number of local sites 103. Within each of local sites 103 are a number of peripheral devices 106. For example, each of the local sites 103 may comprise a hotel and each of the peripheral devices 106 are located in the rooms of each hotel, although local sites 103 may comprise other venues beyond hotels. Also, a local server 109 is located at each of the local sites 103. Each of the local servers 109 includes a local agent 111. The peripheral devices 106 and the local servers 109 are in data communication with each other via, for example, a local area network 113 or other such network, as can be appreciated by those with ordinary skill in the art. Consequently, each of the local agents 111 that are executed on a respective local server 109 is in data communication with the peripheral devices 106 at the respective local sites 103.

Each of the peripheral devices 106 may comprise, for example, a printer, a scanner, a fax machine, a public terminal, a network access device, a wireless network access device, or other peripheral device.

The central monitoring network 100 also includes a central monitoring server 116 that is located on a central monitoring site 119. Executed on the central monitoring server 116 is a central monitoring system 121. The central monitoring server 116 is linked to the local area networks 113 through a network 123. In this respect, the network 123 may comprise, for example, the Internet, wide area networks, or other appropriate networks. The local area networks 113 are coupled to the network 123 through a gateway 126 or other appropriate device as can be appreciated by those with ordinary skill in the art. Ultimately, the local area networks 113, the gateways 126, and the network 123, facilitate data communication among the local servers/agents 109/111, the peripheral devices 106, and the central monitoring server/system 116/121. Likewise, the central monitoring server/system 116/121 may also communicate with each of the peripheral devices 106 as is desirable.

Each of the peripheral devices 106 includes a peripheral device identifier 133 that may be, for example, a serial number. Also, associated with each of the peripheral devices 106 is a central site contact designation 136. The central site contact designation 136 may be, for example, a telephone number, e-mail address, or other contact designation that is displayed on a label on an outer surface of each of the peripheral device 106 or is other indicated in some other manner. The central site contact designation 136 provides a user of the peripheral device 106 with the means to establish communication with technical support personnel at the central site 119 regarding operational aspects of the respective peripheral device 106. In addition, each of the peripheral devices 106 may also include a local site contact designation (not shown) that may be employed by a user to contact support personnel located at the local site 103.

Each of the peripherals 106 maintains a management information base 139 that includes status information relative to the operation of the peripheral device 106. The local agents 111 executed in the local servers 109 obtain and store status information (not shown) from the management information base 139 of each of the peripheral devices 106 using, for example, a Simple Network Management Protocol (SNMP) on a given local site 103. Alternatively, other protocols may be employed such as, for example, a Hypertext Transfer Protocol (HTTP) or other network protocol.

Next, a discussion of the operation of the central monitoring network 100 is provided. To begin, the local agents 111 obtain and store the status information from the management information base 139 of each of the peripheral devices 106 on a given local site 103. To obtain the status information, the local agent 111 periodically requests the status information from each of the peripheral devices 106 via the local area network 113. Alternatively, each of the peripheral devices 106 may transmit the status information to the local agent 111 at predetermined times or under predefined conditions without receiving a request from the local agent 111. The request for the status information may be generated according to a schedule or in some other manner. Ultimately, the status information obtained and stored by the local agents 111 is transmitted to the central monitoring system 121. In this respect, the central monitoring system 121 may "Pull" the status information from the local agents 111 by transmitting a request to each of the local agents 111 for the status information stored thereby. In response to the request, each of local agents 111 transmits the status information stored thereby to the central monitoring system 121. If an appropriate response is not received by the central monitoring system 121 within an acceptable period of time, then the central monitoring system 121 assumes that the respective local agent 111 is not operational. In this manner, the central monitoring system 121 can determine whether the local agent 111 is operational at any given time. Alternatively, each of the local agents 111 may "Push" the status information to the central monitoring system 121 by transmitting the status information to the central monitoring system 121 at predetermined times according to a schedule, etc.

During operation, the central monitoring system 121 detects an existence of at least one service event that is associated with the operation of at least one of the peripheral devices 106. This may be done, for example, by examining the status information received from local agents 111. Similarly, for each local site 103, the local agents 111 detect service events based upon the status information that was harvested from the peripheral devices 106. If they detect a service event, the local agents 111 may transmit a service event alert to the central monitoring system 121. Specifically, the local agents 111 may transmit service event alerts for predetermined types of service events that involve a greater sense of urgency, for example, which may require relatively immediate attention to be resolved. This allows the central monitoring system 121 to be informed of service events between successive transmissions of status information from the local agents 111. The service event alert generated by the local agents 111 and transmitted to the central monitoring system 121 includes an indication of the service event. Thus, in addition to detect service events by analyzing the status information stored in the central monitoring server 116, the central monitoring system 121 may also detect the existence of a service event from service event alerts received from the local agents 111.

Once a service event has been detected by the central monitoring system 121, then the central monitoring system 121 lists the service event on a status board that is accessed by monitoring personnel who then address the service event as necessary.

A "service event" is defined herein as the circumstance or set of circumstances that gives rise to the need to service a peripheral device 106 for one reason or another. For example, assuming that the peripheral device 106 is a printer, then service events might include an occurrence of, for example, low toner, low or empty paper trays, low ink, a paper jam, a printer door open, a non-responsive printer, or other event that may require service attention.

Also, the local agents 111 may inform the respective proprietors of local sites 103 of service events that are to be addressed at the local sites 103. In such situations, the service events that can be addressed by local personnel may include those service events that do not require much technical savvy such as, for example, refilling paper in an empty printer, etc. Alternatively, the central monitoring system 121 may transmit a communication to the proprietor of the local site 103 to perform the maintenance tasks based upon the service events detected by the central monitoring system 121.

By virtue of the fact that the monitoring of the performance of the peripheral devices 106 is performed by personnel at the central monitoring site 119, the duties of personnel at the local sites 103 to monitor the condition of each of the peripheral devices 106 is correspondingly diminished. As such, the burden imposed upon the proprietor of local sites 103 to service or otherwise maintain peripheral devices 106 is correspondingly diminished.

To cite a specific example, assuming that the peripheral devices 106 are printers in hotel rooms, the management of the hotel can provide printer services to its guests without having to employ personnel who oversee the operation of the printers 106. Thus, the cost of providing printing services to hotel guests is reduced, thereby making the placement of printers within hotel rooms economically feasible. In addition, the proprietor of the central monitoring site 119 may charge each of the proprietors of the local sites 103 a fee for the monitoring functions performed by the central monitoring system 121, thereby generating revenue. Also, the use of the local agents 111 in conjunction with the central monitoring site 119 reduces the amount of network traffic over the network 123 where the network 123 may be, for example, the Internet, a wide area network, or other network. This is because communication is not necessary between the central monitoring site 119 and each of the peripheral devices 106 to harvest the status information from each of the peripheral devices 106.

Figure 2:
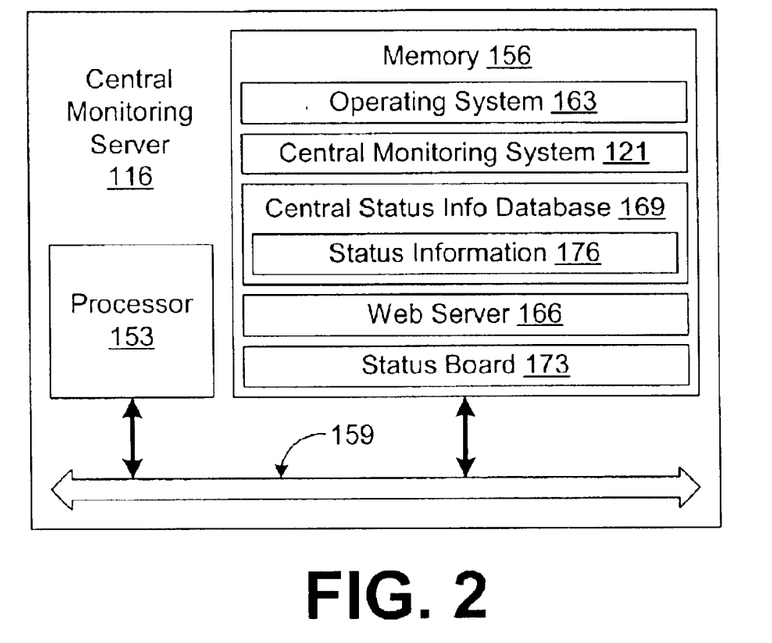
FIG. 2 is a block diagram of a central monitoring server employed at a central monitoring site in the peripheral monitoring network of FIG. 1 according to an embodiment of the present invention.

With reference to FIG. 2, shown is a block diagram of the central monitoring server 116 according to an embodiment to the present invention. The central monitoring server 116 includes a processor circuit having a processor 153 and the memory 156, both of which are coupled to a local interface 159. The local interface 159 may be, for example, a data bus with an accompanying control/address bus, as can be appreciated by those with ordinary skill in the art.

Stored on the memory 156 and executable by the processor 153 are a number of software components including an operating system 163, a central monitoring system 121, a web server 166, a central status information database 169, and a status board 173. The central status information database 169 includes status information 176 that describes the operation of the peripheral devices 106. The central monitoring system 121 is executed in the central monitoring server 116 to provide for monitoring of the peripheral devices 106 (FIG. 1) located at the local sites 103, as will be described. The central status information database 169 is employed to store the status information 176 that is harvested from the local agents 111. The status board 173 provides for a listing of service events that may occur relative to the operation of the peripheral devices 106, as will be described. Also, the web server 166 may be some other type of server system that serves up various content based upon requests directed thereto. Specifically, the information contained in the status board 173 may be served up as a web page or other content item as will be described.

Figure 3:
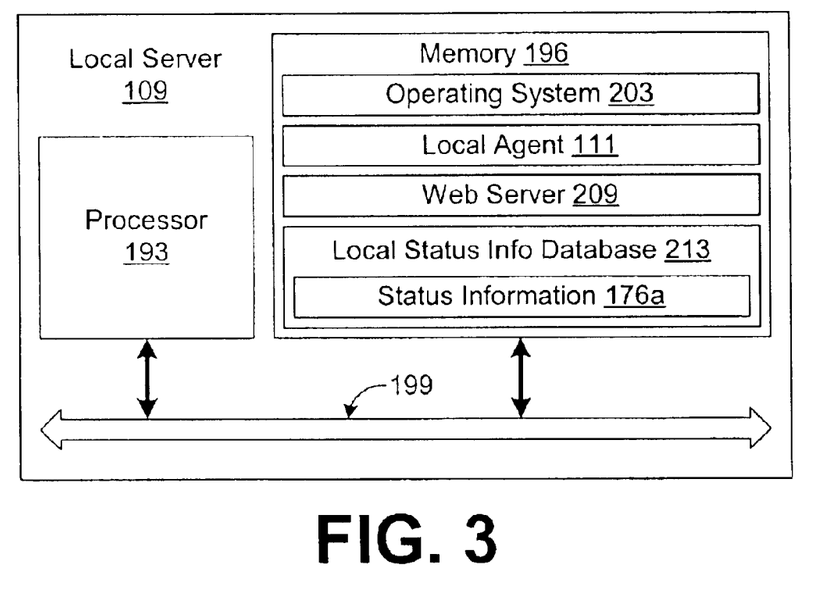
FIG. 3 is a block diagram of a local agent employed at a local site in the peripheral monitoring network of FIG. 1 according to an embodiment of the present invention.

Referring next to FIG. 3, shown is a block diagram of a local server 109 according to an embodiment to the present invention. The local server 109 includes a processor circuit having a processor 193 and a memory 196, both of which are coupled to a local interface 199. The local interface 199 may be, for example, a data bus with an accompanying control/address bus, as can be appreciated by those with ordinary skill in the art.

Stored on the memory 196 and executed by the processor 193 are a number of software components including an operating system 203, a local agent 111, a web server 209, and a local status information database 213. Stored within the local status information database 213 is status information 176a from the peripheral devices 106 (FIG. 1). Within each of the local servers 109, the local agents 111 harvest status information from the peripheral devices 106 (FIG. 1) and store the status information 176a within the respective local status information databases 213. The local agents 111 also provide the status information 176a to the central monitoring system 121 (FIG. 2) and perform other functions as will be described. In this respect, the status information 176a is that which is associated with the peripheral devices 106 on a respective local site 103. Thus, the status information 176a is a subset of the status information 176 (FIG. 2) stored in the central monitoring server 116 (FIG. 1) as the status information 176 includes the status information 176a from all of the local servers 109.

Alternatively, the operating system 203, a local agent 111, a web server 209, and a local status information database 213 may be located within a peripheral device 106 that includes the processing capacity to execute such components. This may be implemented, for example, when there are only a few centralized peripheral devices 106 within a particular local site 103, etc.

Employing the local agents 111 to harvest and store status information 176a from the peripheral devices 106 as an intermediary between the peripheral devices 106 and the central monitoring system 121 provides for various advantages in the transmission of data traffic in the central monitoring network 100 (FIG. 1). Specifically, since the local agents 111 harvest the status information 176a from each of the peripheral devices 106, the central monitoring system 121 need only communicate with the local agents 111 to obtain the status information 176. Thus, the data traffic load on the central monitoring system 121 is reduced significantly and network bandwidth of the network 123 is not unnecessarily consumed. Also, the use of the local agents 111 ensures that the most accurate information is obtained from the peripheral devices 106 as the local agents 111 can harvest the status information 176a more frequently.

Figure 4:
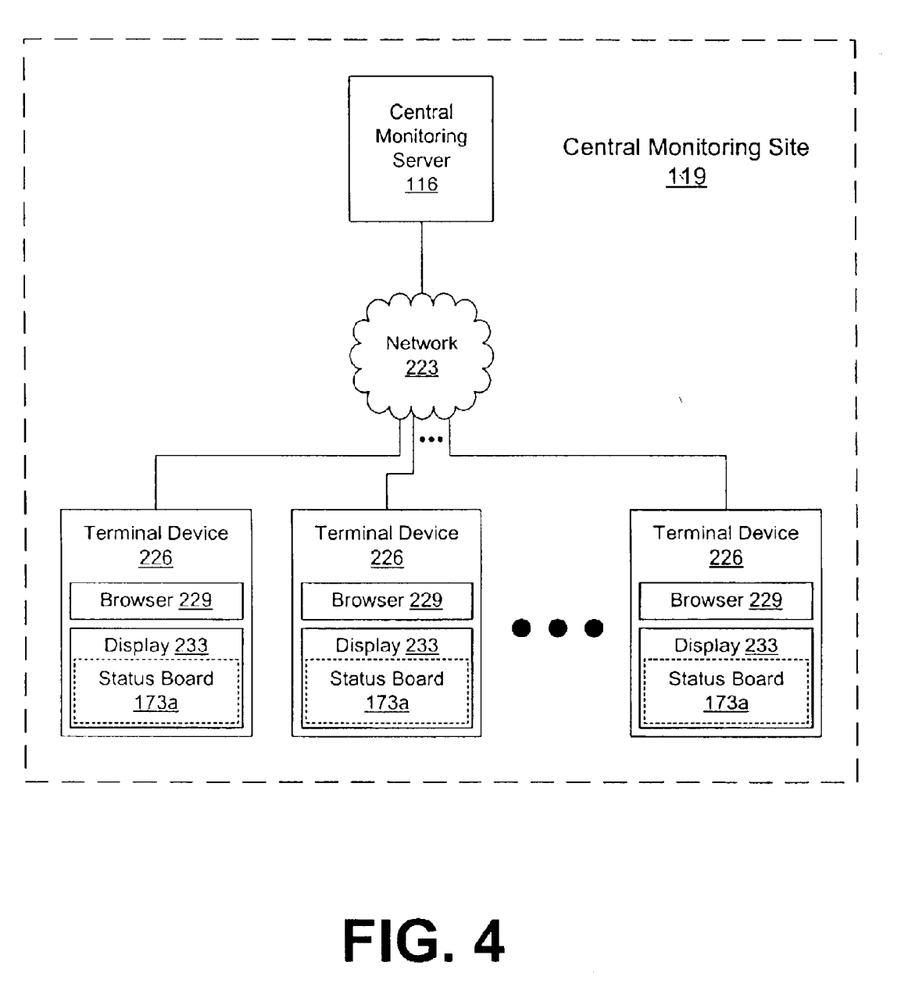
FIG. 4 is a block diagram of a central monitoring network located at the central monitoring site that includes the central monitoring server of FIG. 2 according to an embodiment of the present invention.

With reference to FIG. 4, shown is the central monitoring site 119 according to an embodiment of the present invention. The central monitoring site 119 may comprise, for example, the central monitoring server 116, a network 223, and a number of terminal devices 226. The network 223 may be, for example, a local area network, a wide area network, the Internet, a wireless network, or other network as can be appreciated by those ordinary skill in the art. Each of the terminal devices 226 may comprise, for example, a computer system or other device with like capability. Also, each of the terminal devices 226 includes, for example, a browser 229 and a display device 233. The terminal devices 226 may also include an operating system and other software components, as can be appreciated by those with ordinary skill in the art.

The individuals that employ the terminal devices 226 provide technical support for the peripheral devices 106 (FIG. 1) located at the local sites 103 (FIG. 1). In this regard the individuals need to be apprised of any service events associated with the respective peripheral devices 106 that are to be addressed. To provide such information, a technical support person may manipulate the browser 229 in one of the terminal devices 226 to access the status board 173 (FIG. 2) that is displayed on the display device 233 as status board user interface 173a. In addition, the web server 209 (FIG. 3) may be employed to serve up requested status information 176a based upon specific requests generated by a technical support person using the browser 229. In this manner, a technical support person at the central monitoring site 119 may obtain status information from the central status information database 169 or from the local status information database 213 as needed. In addition, the browsers 229 may be manipulated to send a request to the web server 209 to obtain up-to-date status information regarding a specified one of the peripheral devices 106. In this manner, the web server 209 may interface with the local agent 111 (FIG. 3) and/or the local status information database 213 (FIG. 3) as necessary to obtain such information, etc.

Figure 5:
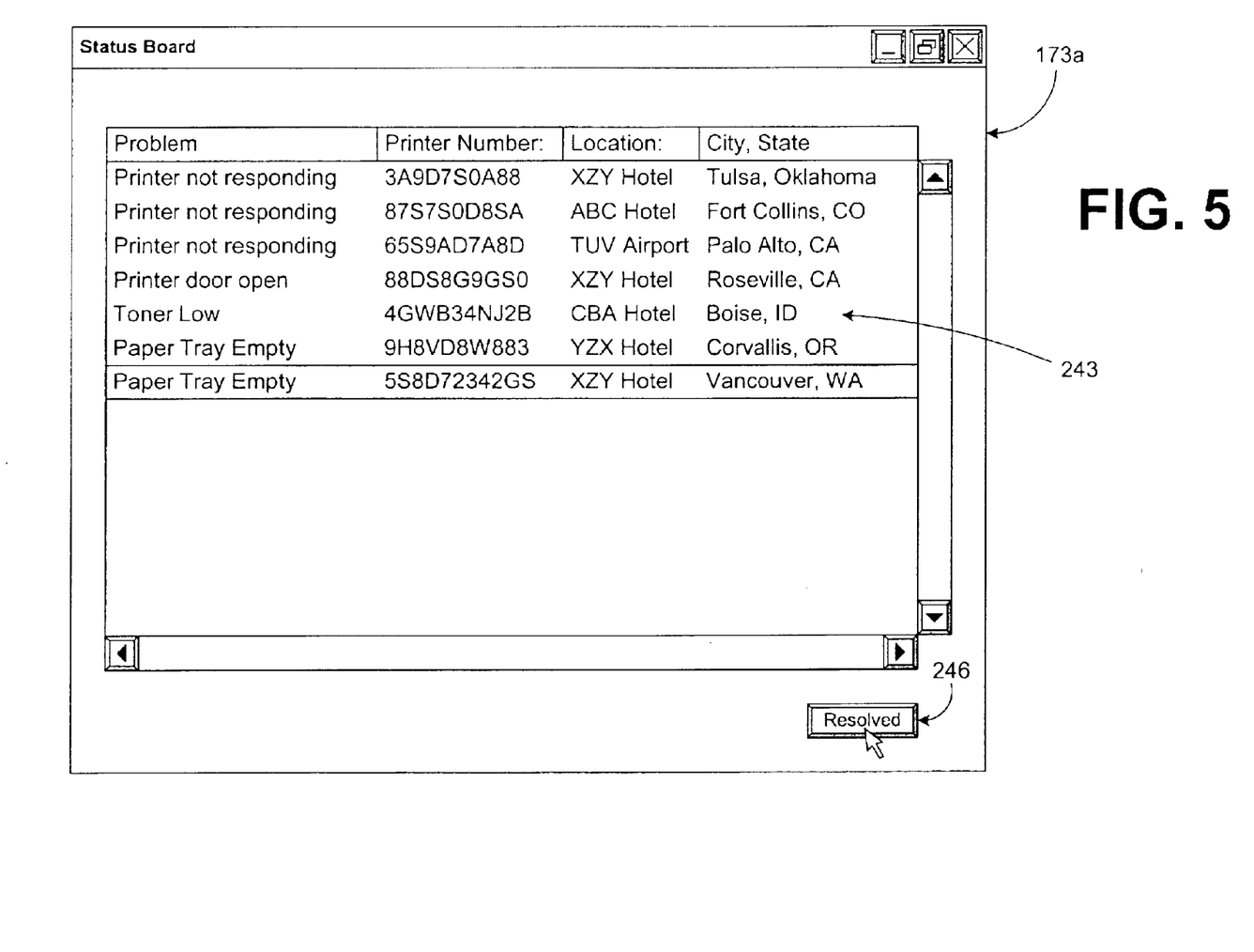
FIG. 5 is a drawing of a user interface displayed on at least one terminal device employed in the central monitoring network of FIG. 4 according to an embodiment of the present invention.

Referring next to FIG. 5, shown is an example of a status board user interface 173a that displays the information contained in the status board 173 according to an embodiment of the present invention. The status board user interface 173a lists a number of service events 243 associated with respective peripheral devices 106 (FIG. 1) at various local sites 103 (FIG. 1). Although not shown, the status board user interface 173a may also include a technical service person designation associated with each of the service events 243 that indicates a specific technical representative to which the service events 243 has been assigned for a resolution. The status board user interface 173a may also include a number of other graphical user interface components that perform other various functions.

A technical representative may employ a cursor to select one of the service events 243 that has been resolved and may click on or otherwise manipulate the "Resolved" button 246 to remove the respective service event 243 from the status board 173. In this manner, personnel at the central monitoring site 119 (FIG. 1) are apprised of all the service events 243 that need their attention to effect a resolution. Because personnel at the central monitoring site 119 ensure the reliability of the operation of all the peripheral devices 106 at all of the local sites 103, the maintenance burden experienced by the proprietors of the local sites 103 in insuring that the peripheral devices 106 are operating properly for guests or other intended users is significantly reduced.

Figure 6:
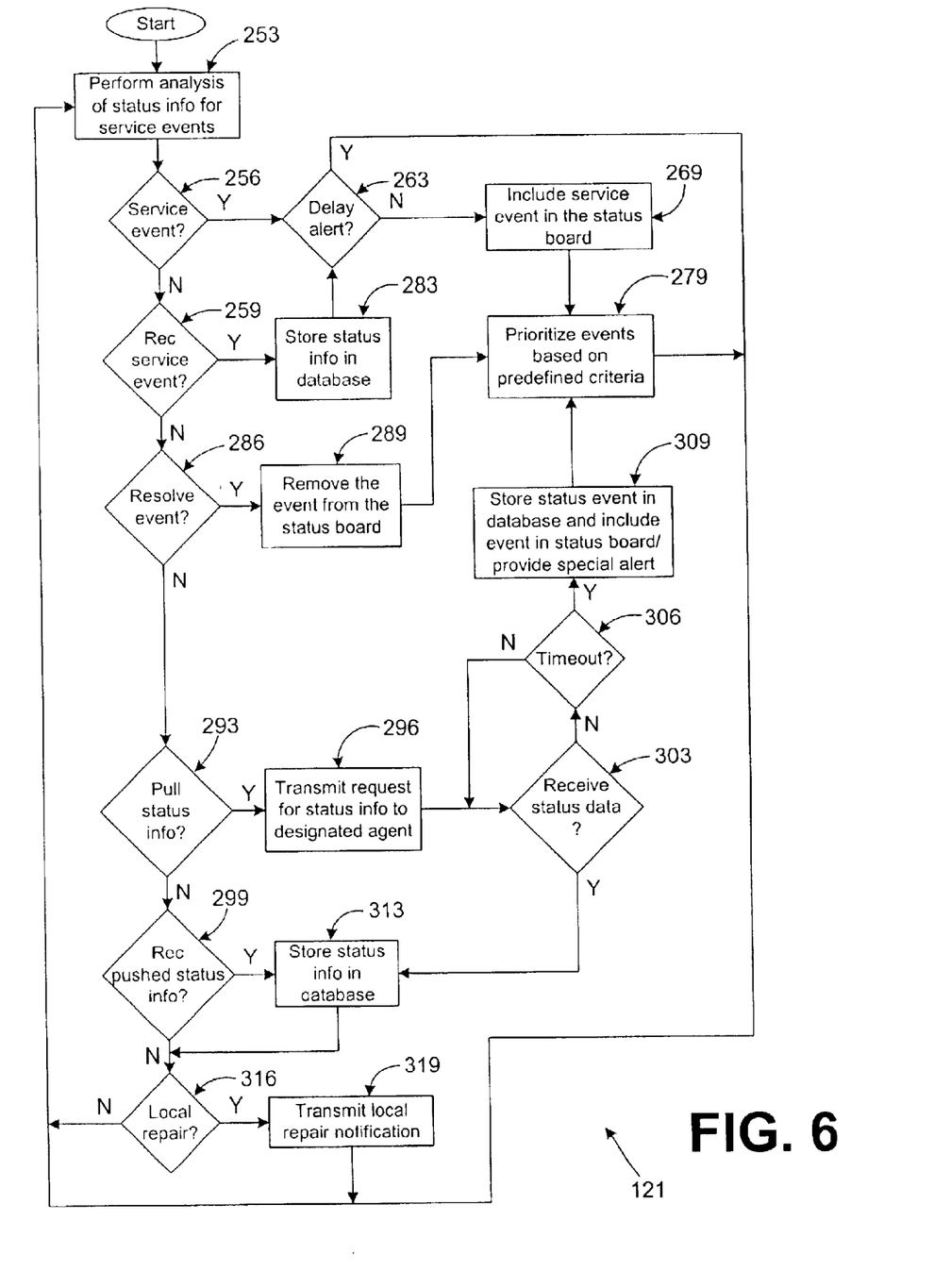
FIG. 6 is a flow chart that depicts the operation of the central monitoring server of FIG. 2 according to an embodiment of the present invention.

The status board user interface 173a may actually be served up by the web server 166 within the central monitoring server 116 (FIG. 2), for example, as a web page, etc. In this regard, the browser 229 (FIG. 4) may be employed to access the status board user interface 173a. Alternatively, the status board user interface 173a may be displayed on a large view screen or other such display to be viewed by multiple technical personnel at the central monitoring site 119. Turning then to FIG. 6, shown is an exemplary flow chart that provides an illustration of the operation of the central monitoring system 121. Alternatively, the flowchart of FIG. 6 may be viewed as depicting steps of a method implemented in the central monitoring server 116 (FIG. 2) to monitor the operation of the peripheral devices 106 (FIG. 1) at the local sites 103 (FIG. 1). The central monitoring system 121 described in the flow chart of FIG. 6 may be implemented using any one of a number of programming languages such as, for example, C++, JAVA™, or other suitable programming languages. Also, the central monitoring system 121 may be implemented as object oriented code or using some other architecture.

Beginning with box 253, first the central monitoring system 121 performs an analysis of the status information stored within the central status information database 169 (FIG. 2) to identify service events. Thereafter, in box 256, if no service event 243 (FIG. 5) is detected from the analysis of the status information 176, then the central monitoring system 121 proceeds to box 259. However, if a service event 243 is detected in box 256, then the central monitoring system 121 proceeds to box 263. Additionally, the central monitoring system 121 may detect an existence of a service event 243 in box 259 by receiving a service event alert from a local agent 111, where the service event alert includes a description of the service event 243.

Assuming that a service event 243 was detected in box 256, then in box 263 the central monitoring system 121 determines whether a delay should be imposed before the detected service event 243 is included in the status board 173 (FIG. 1) to provide an opportunity for self-resolution. This may be the case, for example, where a peripheral device 106 may be a printer with a printer door open. Specifically, the printer door may be open temporarily while local maintenance personnel replace the toner cartridge or perform some other routine task. As such, the service event 243 will be resolved by itself assuming that the individual who is performing a routine maintenance task closes the printer door. Accordingly, an appropriate delay is imposed before such a service event 243 is displayed on the status board 173. This ensures that self-resolution is not likely to occur for those service events 243 that are included in the status board 173, such as, where an individual who services a printer device fails to close the printer door properly and neglects to properly close the printer door. In this manner, the time of support personnel is not unnecessarily occupied with resolving service events 243 that are eliminated by self-resolution.

In order to determine whether a delay is to be imposed before a service event 243 is included in the status board 173, the central monitoring system 121 may consult a table that is stored in the memory 156 (FIG. 2) that indicates all types of service events 243 for which a delay is to be imposed. Such a table would also indicate the time duration of the delay imposed for each type of service event 243, where such time durations may differ depending upon the type of service event 243 involved. The actual time durations may be imposed based upon experience and other factors, etc. To impose a delay, the central monitoring system 121 may initiate a timer at the time respective service events 243 are detected to track the progress of the delay. If self-resolution occurs before the entire delay has occurred, then the service event 243 disappears and is not detected in box 256.

If it is determined in box 263 that a respective service event 243 has been delayed by an appropriate length of time, the central monitoring system 121 proceeds to box 269 in which the service event 243 is included in the status board 173. Thereafter, the central monitoring system 121 proceeds to box 279 in which the status events 243 listed in the status board 173 are prioritized based upon predefined criteria. Specifically, the predefined criteria may comprise various weights that are assigned to each of the types of service events 243 that may occur. When a service event 243 is included in the status board 173, a weight may be assigned thereto that is employed in prioritizing the service events 243 relative to each other. After the service events 243 have been prioritized in box 279, then the central monitoring system 121 reverts back to box 253 as shown.

Referring back to box 256, if no service event 243 is detected, then the central monitoring system 121 proceeds to box 259. In box 259 the central monitoring system 121 determines whether a service event alert has been received from one of the local agents 111 (FIG. 1). Each service event alert received from one of the local agents 111 includes the details of a service event 243 that was detected by the respective local agent 111. The central monitoring system 121 thus detects the existence of a service event 243 from the service event alert received from a local agent 111. In this respect, the local agents 111 perform analysis of the status information 176a (FIG. 3) stored in the memory 196 (FIG. 3) to detect service events 243. If the service event 243 is detected by a local agent 111, then the local agent 111 generates and transmits the corresponding service event alert to the central monitoring system 121.

Assuming that a service event alert was received from a local agent 111 as detected in box 259, then the central monitoring system 121 proceeds to box 283 in which the corresponding status information included in the service event alert is stored in the central status information database 169 (FIG. 2). Thereafter, the central monitoring system 121 moves to box 263 as shown.

In box 259, if the central monitoring system 121 determines that no service event alert has been received from a respective local agent 111, then the central monitoring system 121 proceeds to box 286 in which it is determined whether a service event 243 has been resolved. In this regard, a service event 243 may be resolved by itself. In such case the central monitoring system 121 detects that a service event 243 has been resolved by detecting a corresponding change in the status information 176 indicating that the service event no longer exists. Alternatively, technical support personnel may indicate that a service event 243 has been resolved by clicking on the "Resolved" button 246 as was described above.

If it has been determined that a service event 243 has been resolved in box 286, then the central monitoring system 121 proceeds to box 289. Otherwise, the central monitoring system 121 moves to box 293. In box 289, the resolved service event 243 is removed from the status board 173. Thereafter, the central monitoring system 121 proceeds to box 279 to prioritize the service events 243 remaining in the status board 173 taking into account the removal of the resolved service event 243.

However, if no resolved service events 243 are detected in box 286, then the central monitoring system 121 proceeds to box 293 in which it is determined whether the central monitoring system 121 should harvest status information from one or more local agents 111. This may be determined, for example, by consulting a pre-existing schedule that indicates when the central monitoring system 121 should harvest status information from one more local agents 111. Assuming that the central monitoring system 121 is to harvest the status information from one or more local agents 111 in box 293, then the central monitoring system 121 proceeds to box 296 in which a request for current status information is generated and transmitted to one or more designated local agents 111. On the other hand, if no status information is to be harvested in box 293, then the central monitoring system 121 proceeds to box 299.

Assuming that the central monitoring system 121 transmits the request in box 296, then the central monitoring system 121 proceeds to box 303 in which it is determined whether a reply has been received from the respective local agents 111 that includes the requested status information. If not, then the central monitoring system 121 proceeds to box 306 in which it is determined whether a timeout has occurred while the central monitoring system 121 waits for a proper reply. In this respect, a timer is executed at the time each request is transmitted to a local agent 111.

Assuming that the timeout has not occurred in box 306, then the central monitoring system 121 reverts back to box 303. In this respect, the central monitoring system 121 waits for a proper reply for a predetermined period of time once a request is transmitted in box 296. On the other hand, if the timeout occurs in box 306, then the central monitoring system 121 proceeds to box 309 in which the status of the respective local agent 111 is included in the status board 173 to inform technical support personnel that the respective local agent 111 is not responsive. Accordingly, the technical support personnel may then take appropriate corrective action. Thereafter, the central monitoring system 121 proceeds to box 279 to prioritize the service events 243 in the status board 173. In addition, in box 309 other action may be taken to inform technical support personnel that the respective local agent 111 is not responsive such as generating a special alert that is communicated to appropriate support personnel, etc.

With reference back to box 303, if a proper reply is received from the respective local agents 111 in response to the request transmitted in box 296, then the central monitoring system 121 proceeds to box 313 in which the newly acquired status information 176a received in the reply is stored in the central status information database 169 (FIG. 2) as the status information 176. In the event that the status information 176a for the same peripheral devices 106 already exists in the central status information database 169, it is over written with the updated status information 176a. In this manner, the status information within the central status information database 169 is kept up-to-date.

Turning back to box 293, if no status information is to be harvested from respective local agents 111, then the central monitoring system 121 proceeds to box 299 in which it is determined whether status information transmitted by the local agents 111 without solicitation on the part of the central monitoring system 121 has been received. In this regard, the status information is being "Pushed" to the central monitoring system 121 by the local agents 111. This is in contrast to the actions taken by the central monitoring system 121 as was discussed above with reference to box 293 in which the status information is "Pulled" from the local agents 111. While either approach may be employed, the use of the "Pull" scenario is advantageous as it provides the central monitoring system 121 with the opportunity to determine whether a respective local agent 111 is non-responsive. In addition, assuming that requests generated and transmitted in box 296 are generated and transmitted according to a predefined schedule, then this schedule need only be altered at the central monitoring system 121 to change the times that the status information flows from the local agents 111 to the central monitoring system 121. This contrasts with the fact that similar schedules maintained at the local agents 111 that direct when data is to be pushed to the central monitoring system 121 would have to be altered at each of the local agents 111. However, use of a "Push" scenario facilitates immediate notification to the central monitoring system 121 of the occurrence of service events 243, assuming that the events are pushed immediately when they occur.

If the central monitoring system 121 receives pushed data from one or more local agents 111 in box 299, then the central monitoring system 121 proceeds to box 313 as shown. If no pushed data is received from the respective local agents 111 in box 299, or if the status information 176a is stored in the central status information database 169 (FIG. 2) in box 313, then the central monitoring system 121 proceeds to box 316 in which it is determined whether local action or repair need be taken at the local site 103 based upon at a predefined service event 243. In this respect, a table may be maintained in the memory 156 (FIG. 2) that indicates which service events 243 require local action or repair. To make the determination as to whether a service event 243 requires local action or repair, the table may be consulted accordingly.

Local action or repairs may encompass a number of different tasks. For example, assume that a given service event 243 specifies that a peripheral device 106 such as a printer has an empty paper tray, then the local action required is that personnel at the local sites 103 need to refill the paper tray. There may be any number of local actions are repairs and that can be performed by personnel at the local sites 103.

Assuming in box 316 that a local repair or action is necessary based upon a given service event 243, then the central monitoring system 121 proceeds to box 319 in which a local repair notification is transmitted to personnel at the local site 103. The local repair notification may be transmitted in any one of a number of ways such as, for example, via telephone, pager, email, or other approaches. Once notification has been transmitted in box 319, then the central monitoring system reverts back to box 253. Assuming that it is determined in box 316 that a local repair or action is not to be undertaken, then the central monitoring system 121 also reverts back to box 253.

Figure 7:
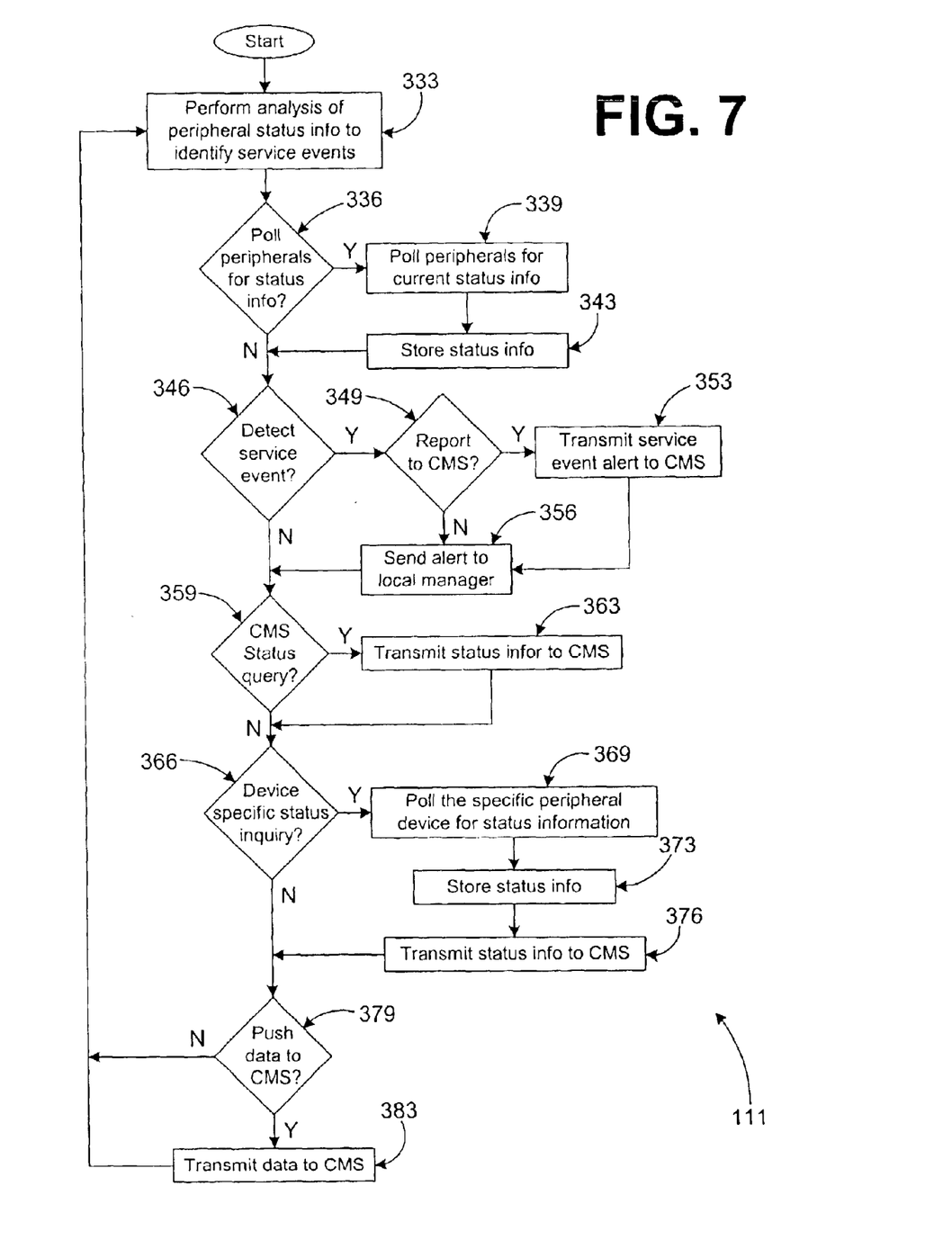
FIG. 7 is a flow chart that depicts the operation of the local agent of FIG. 3 according to an embodiment of the present invention.

Referring next to FIG. 7, shown is an exemplary flow chart of the local agents 111 according to an embodiment of the present invention. Alternatively, the flowchart of FIG. 7 may be viewed as depicting steps of a method implemented in the local servers 109 to harvest the status information 176a (FIG. 3) and to communicate with the central monitoring system 121 as well as performing other functions as will be described.

Beginning with box 333, the local agent 111 performs an analysis of the status information 176a to identify service events 243 (FIG. 5). In order to allow the local agent 111 to recognize a service event 243, the conditions that give rise to a service event 243 may be stored in an appropriate table within the memory 196 (FIG. 3) for reference by the local agent 111. Thereafter, in box 336, the local agent 111 determines whether it should poll the peripheral devices 106 (FIG. 1) for current status information 176a. The polling of the peripheral devices 106 may be performed based upon a predefined schedule or in some other manner. Alternatively, the polling of the peripheral devices 106 may be a continuous operation.

Assuming that the peripheral devices 106 are to be polled in box 336, then the local agent 111 proceeds to box 339 in which the peripheral devices 106 are polled for current status information 176a. Thereafter, in box 343, the local agents 111 store the status information 176a in the local status information database 213 (FIG. 3). If the peripheral devices 106 are not to be polled in box 336 or once the status information 176a is stored in the local status information database 213, then the local agent 111 proceeds to box 346 in which it is determined whether a service event 243 has been detected based upon the analysis performed in box 333 described above. If so, then the local agent 111 moves to box 349 to determine whether the status event 243 is to be reported to the central monitoring system 121 (FIG. 1). If such is the case then the local agent 111 proceeds to box 353 in which a service event alert is generated and transmitted to the central monitoring system 121 at the central site 119 (FIG. 1) to inform the central monitoring system 121 of the existence of the service event 243. Thereafter, the local agent 111 proceeds to box 356. Also, if no service event alert is to be transmitted to the central monitoring system 121 as determined in box 349, then the local agent 111 proceeds to box 356 as well.

In box 356, an alert is transmitted to a local manager at the local site 103 that informs local maintenance personnel of the need to address the service event 243. In this manner, the alert may be transmitted using e-mail, pager, telephone or other medium. Thereafter, the local agent 111 proceeds to box 359. Likewise, if no service event 243 is detected in box 346, then the local agent 111 proceeds to box 359. In box 359, the local agent 111 determines whether the central monitoring system 121 has transmitted a request for status information 176a. If such is the case, then the local agent 111 proceeds to box 363 in which the status information 176a is transmitted to the central monitoring system 121. Once the status information 176a has been transmitted to the central monitoring system 121 in box 363 or if no status request has been received from the central monitoring system 121 in box 359, the local agent 111 proceeds to box 366.

In box 366, the local agent 111 determines whether a device specific status inquiry has been received from either the central monitoring system 121 or from terminal devices 226 (FIG. 4) at the central monitoring site 119. Such a device specific status inquiry may be received from one of the terminal devices 226 as support personnel try to access specific information about a particular peripheral device 106, as necessary. If a device specific status inquiry has been received in box 366, then the local agent 111 proceeds to box 369 in which the specific peripheral device 106 is polled for current status information. Thereafter, in box 373 the local agent 111 stores the newly acquired status information in the local status information database 213 (FIG. 3). In doing so, the local agent 111 overwrites any pre-existing status information for the same peripheral device 106 that is already stored in the local status information database 213.

Next, in box 376, the newly acquired status information regarding the specific peripheral device 106 is transmitted to the central monitoring system 121. Thereafter, the local agent 111 proceeds to box 379. Likewise, if no device specific status inquiry is received in box 366, then the local agent 111 proceeds to box 379, as well.

In box 379, the local agent 111 determines whether data is to be pushed to the central monitoring system 121. This may be determined, for example, by consulting a predefined table that is stored in the memory 196 (FIG. 3) that includes, for example, a schedule of times when the status information 176a is to be pushed to the central monitoring system 121. If the status information 176a is to be pushed to the central monitoring system 121 in box 379, then the local agent 111 proceeds to box 383 in which the status information 176a is transmitted to the central monitoring system 121. Thereafter, the local agent 111 reverts back to box 333. Likewise, if no data is to be pushed to the central monitoring system 121 in box 379, then the local agent 111 also reverts back to box 333, as shown.

Although the central monitoring system 121 and the local agent 111 are described as being embodied in software or code executed by general purpose hardware as discussed above, as an alternative they may also be embodied in dedicated hardware or a combination of software/general purpose hardware and dedicated hardware. If embodied in dedicated hardware, the central monitoring system 121 and the local agent 111 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 6 and 7 show the architecture, functionality, and operation of an implementation of the central monitoring system 121 and the local agent 111. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the central monitoring system 121 and the local agent 111 comprises software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the central monitoring system 121 and the local agent 111 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for providing support for a number of peripheral devices, comprising:

storing the amount of status information obtained from the peripheral devices in a local server;

transmitting the amount of status information associated with each of the peripheral devices from the local server to a central monitoring server;

storing the amount of status information in the central monitoring server;

analyzing the status information in the central monitoring server to detect an existence of at least one service event associated with an operation of at least one of the peripheral devices;

maintaining a status board for the indication of a plurality of detected service events;

imposing a delay with respect to the at least one service event after the at least one service event is detected in the status information in the central monitoring server to provide a period of time for self-rectification of the at least one service event; and including the at least one service event on the status board as one of the detected service events after the delay.

2. The method of claim 1, further comprising transmitting a request from a central monitoring system in the central monitoring server to a local agent in the local server for the transmission of the amount of status information by the local agent to the central monitoring system.

3. The method of claim 1, further comprising determining in the central monitoring system whether the local agent is operational.

4. A network for providing support for a number of peripheral devices, comprising:

a local agent in a local server that is in data communication with the number of peripheral devices;

an amount of status information obtained from the peripheral devices and stored in the local server;

a central monitoring system in a central monitoring server that is in data communication with the local agent;

a copy of the status information transmitted from the local agent to the central monitoring system and stored in the central monitoring server;

a status board maintained by the central monitoring system, the status board indicating at least one service event associated with an operation of at least one of the peripheral devices;

the central monitoring system further comprising logic that examines the amount of status information stored in the central monitoring server to detect the existence of the at least one service event; and wherein the central monitoring system imposes a delay between the detection of the at least one service event and the inclusion of the at least one service event on the status board to provide a period of time for self-rectification of the at least one service event.

5. The system of claim 4, further comprising a request that is generated by the central monitoring system and transmitted to the local agent for the transmission of the copy of the status information.

6. A system for providing support for a number of peripheral devices, comprising:

first means for obtaining and storing an amount of status information from the peripheral devices at a local site;

second means for obtaining and storing a copy of the amount of status information from the first means, the second means being located at a central site;

a status board for indicating at least one service event associated with an operation of at least one of the peripheral devices, the status board being located at the central site; and wherein the second means further comprises:

means for detecting the at least one service event from the copy of the amount of status information obtained and stored by the second means;

means for including the at least one service event on the status board; and means for imposing a delay between a detection of the at least one service event and the inclusion of the at least one service event on the status beard to provide a period of time for self-rectification of the at least one service event.

7. The system of claim 6, wherein the second means further comprises means for generating and transmitting a request to the first means for the transmission of the copy of the status information.

* * * * *